(12) United States Patent
Ma et al.

(10) Patent No.: US 9,939,689 B2
(45) Date of Patent: Apr. 10, 2018

(54) METHOD FOR CURVED DISPLAY PANEL

(71) Applicant: SHENZHEN CHINA STAR OPTOELECTRONICS CO., LTD., Guangdong (CN)

(72) Inventors: Chao Ma, Guangdong (CN); Xiaolong Ma, Guangdong (CN)

(73) Assignee: Shenzhen China Star Optoelectronics Co., Ltd., Guangdong (CN)

( * ) Notice: Subject to any disclaimer, the term of this patent is extended or adjusted under 35 U.S.C. 154(b) by 1 day.

(21) Appl. No.: 15/357,580

(22) Filed: Nov. 21, 2016

(65) Prior Publication Data

US 2017/0068124 A1    Mar. 9, 2017

Related U.S. Application Data

(63) Continuation of application No. 14/416,585, filed as application No. PCT/CN2014/092854 on Dec. 3, 2014.

(30) Foreign Application Priority Data

Nov. 20, 2014    (CN) .......................... 2014 1 0692792

(51) Int. Cl.
  *G02F 1/1339*   (2006.01)
  *G02F 1/1335*   (2006.01)
  *G02F 1/1368*   (2006.01)
  *G02F 1/1362*   (2006.01)

(52) U.S. Cl.
  CPC ........ *G02F 1/13394* (2013.01); *G02F 1/1368* (2013.01); *G02F 1/133514* (2013.01); *G02F 1/1362* (2013.01); *G02F 2001/13396* (2013.01); *G02F 2201/56* (2013.01)

(58) Field of Classification Search
  CPC ....... G02F 2001/13396; G02F 1/13394; G02F 1/1339
  See application file for complete search history.

(56) References Cited

U.S. PATENT DOCUMENTS

| | | | |
|---|---|---|---|
| 2009/0161048 A1 | 6/2009 | Satake et al. | |
| 2010/0289996 A1* | 11/2010 | Wang | G02F 1/133305 349/155 |
| 2011/0228190 A1 | 9/2011 | Yang et al. | |
| 2014/0092350 A1 | 4/2014 | Byeon et al. | |
| 2016/0026023 A1* | 1/2016 | Zhao | G02F 1/133305 359/892 |

FOREIGN PATENT DOCUMENTS

| | | |
|---|---|---|
| CN | 101464582 A | 6/2009 |
| CN | 101566756 A | 10/2009 |
| CN | 103149744 A | 6/2013 |
| CN | 103713426 A | 4/2014 |
| JP | 2010066706 A | 3/2010 |
| TW | 201133430 A1 | 10/2011 |

* cited by examiner

*Primary Examiner* — Kendrick Hsu

(74) *Attorney, Agent, or Firm* — Kirton McConkie; Evan R. Witt

(57) ABSTRACT

A design method for a curved display panel and a curved display device are is provided. The curved display panel comprises a curved thin film transistor array substrate, a liquid crystal layer, a curved color filter substrate, and a spacer assembly. The spacer assembly is used to maintain a predetermined distance between the curved thin film transistor array substrate and the curved color filter substrate. A display defect caused by an uneven cell thickness of the curved display panel is avoided.

3 Claims, 4 Drawing Sheets

METHOD FOR CURVED DISPLAY PANEL

CROSS REFERENCE TO RELATED APPLICATIONS

This application is a continuation application of U.S. patent application Ser. No. 14/416,585, filed on Jan. 22, 2015, the disclosure of which is incorporated herein by reference.

FIELD OF THE INVENTION

The present invention relates to a technical field of displays, and more particularly to a design method for a curved display panel.

BACKGROUND OF THE INVENTION

A traditional curved liquid crystal display is generally formed by a technical solution which is as follows:

Bending a flat and sealed liquid crystal display under an external force, and the bending degrees (curvature radius) of the display is decided according to the designed size and viewing distance of the curved liquid crystal display in this process.

Photo spacers are generally provided between a CF substrate and a TFT substrate in a traditional curved liquid crystal display, and the photo spacers are used to maintain a distance between the CF substrate and the TFT substrate, so as to avoid an unusual situation appearing in the thickness of a liquid crystal cell.

However, when the traditional curved liquid crystal display is bent from a flat position to a curved position, a situation of uneven thickness appearing in different portions of a display screen is unavoidable. That is, in the bending processes of the display screen, the photo spacers are compressed into different degrees according to the different bending degrees from the middle area to the two (left-right) side areas of the display screen.

The uneven thickness situation in different areas of the curved display screen easily causes an unusual display.

Hence, it is necessary to provide a new technical solution to solve the above-mentioned problem.

SUMMARY OF THE INVENTION

An object of the present invention is to provide a design method for a curved display panel which can prevent a display defect which is caused by an uneven cell thickness of the curved display panel.

For solving the above-mentioned technical problems, the present invention provides technical solutions which are as follows:

A design method for a curved display panel, comprising: providing a curved display panel, which comprises:
a curved thin film transistor array substrate;
a liquid crystal layer;
a curved color filter substrate; and
a spacer assembly disposed on the curved color filter substrate, wherein the spacer assembly is used to maintain a predetermined distance between the curved thin film transistor array substrate and the curved color filter substrate; wherein the curved display panel comprises:
at least one first area positioned in the middle of the curved display panel; and
at least two second areas positioned at two sides of the first area along a curve of the curved display panel;
wherein the curved color filter substrate and the curved thin film transistor array substrate are assembled into one piece; and the liquid crystal layer is disposed between the curved color filter substrate and the curved thin film transistor array substrate;
wherein, in the first area, a first interval is formed between the curved color filter substrate and the curved thin film transistor array substrate; and in the second areas, a second interval is formed between the curved color filter substrate and the curved thin film transistor array substrate; and the first interval is equal to the second interval;
wherein the curved display panel is formed by bending a flat display panel which is composed of a flat color filter substrate and a flat thin film transistor array substrate;
wherein the curved color filter substrate is a flat color filter substrate when it is in a flat position, and the curved thin film transistor array substrate is a flat thin film transistor array substrate when it is in a flat position;
wherein a third interval is formed between the flat color filter substrate and the flat thin film transistor array substrate of the flat display panel; and
wherein the spacer assembly is used to form the first interval in the first area when the flat display panel has been bent, and is used to form the second interval in the second areas when the flat display panel has been bent; wherein the spacer assembly comprises:
at least one first spacer, wherein the first spacer is disposed in the first area;
and before the flat color filter substrate is bent into the curved color filter substrate, corresponding to the plane of the flat color filter substrate, the first spacer has a first height in a first direction; wherein the first direction is a direction which is perpendicular to the flat color filter substrate; and
at least two second spacers, wherein the second spacers are disposed in the second areas; and before the flat color filter substrate is bent into the curved color filter substrate, corresponding to the plane of the flat color filter substrate, the second spacers have a second height in the first direction;
wherein the first height is greater than the second height;
wherein after the flat color filter substrate has been bent into the curved color filter substrate, the first spacer has a third height, and the second spacers have a fourth height;
the third height is equal to the predetermined distance, and the fourth height is equal to the predetermined distance;
the first spacer is used to be shrunken from the first height to the third height by a compression of the curved color filter substrate and the curved thin film transistor array substrate;
the second spacers are used to be shrunken from the second height to the fourth height by the compression of the curved color filter substrate and the curved thin film transistor array substrate;
wherein in the first area, the sum of a first deformation amount of the curved color filter substrate and a second deformation amount of the curved thin film transistor array substrate is equal to or greater than a first compression amount of the first spacer, wherein the first compression amount is a deformation amount of the first spacer which is compressed by the curved color filter substrate and the curved thin film transistor array substrate;
in the second areas, the sum of a third deformation amount of the curved color filter substrate and a fourth deformation amount of the curved thin film transistor array substrate is equal to or greater than a second compression amount of the second spacers, wherein the second compression amount is a deformation amount of the second spacers which are compressed by the curved color filter substrate and the curved thin film transistor array substrate;

the second compression amount is the difference of the second height and the fourth height;

the first deformation amount is an amount which projects on a first surface of the curved color filter substrate, in the first area along the first curvature radius and toward the curved thin film transistor array substrate; and the first curvature radius is a curvature radius in the first area of the curved color filter substrate, and the first surface is a surface of the curved color filter substrate which faces the liquid crystal layer;

the second deformation amount is an amount which projects or recesses on a second surface of the curved thin film transistor array substrate in the first area along the first curvature radius and toward the curved color filter substrate; and the second surface is a surface of the thin film transistor array substrate which faces the liquid crystal layer;

the third deformation amount is an amount which projects on the first surface of the curved color filter substrate, in the second areas along a second curvature radius and toward the curved thin film transistor array substrate; the second curvature radius is a curvature radius in the second areas of the curved color filter substrate; and the fourth deformation amount is an amount which projects on the second surface of the curved thin film transistor array substrate, in the second areas along a second curvature radius and toward the curved color filter substrate;

wherein a formula for calculating an m-th deformation amount $\Delta Hm$ of the curved color filter substrate is:

$$\Delta Hm = \epsilon m * Dm;$$

the $\epsilon m$ is a strain in an m-th area of the first surface of the curved color filter substrate; the $Dm$ is a thickness in the m-th area of the first surface of the curved color filter substrate; a formula for calculating the $\epsilon m$ is:

$$\epsilon m = ln\{[(\eta m + ym)*am]/(\eta m*am)\} = ln[1+(ym/\eta m)] \approx ym/\eta m;$$

the $\eta m$ is a curvature radius in the m-th area of a middle layer of the curved color filter substrate; the $ym$ is a distance from a deforming point to the middle layer of the curved color filter substrate; the $am$ is a corresponding angle in the m-th area of the middle layer of the first surface of the curved color filter substrate; m is a positive integer;

a formula for calculating an n-th deformation amount $\Delta Hn$ of the the curved thin film transistor array substrate is:

$$\Delta Hn = \epsilon n * Dn;$$

the $\epsilon n$ is a strain in an n-th area of the second surface of the curved thin film transistor array substrate; the $Dn$ is a thickness in the n-th area of the first surface of the curved thin film transistor array substrate; a formula for calculating the $\epsilon n$ is:

$$\epsilon n = ln\{[(\eta n + yn)*an]/(\eta n*an)\} = ln[1+(yn/\eta n)] \approx yn/\eta n;$$

the $\eta n$ is a curvature radius in the n-th area of a middle layer of the curved thin film transistor array substrate; the $yn$ is a distance from a deforming point to the middle layer of the curved thin film transistor array substrate; the $an$ is a corresponding angle in the n-th area of the middle layer of the first surface of the curved thin film transistor array substrate; n is a positive integer.

In the above-mentioned design method for a curved display panel, the m-th deformation amount $\Delta Hm$ comprises: a first deformation amount and a third deformation amount; and the n-th deformation amount $\Delta Hn$ comprises: a second deformation amount and a fourth deformation amount.

In the above-mentioned design method for a curved display panel, the first spacer with the first height and the second spacers with the second height are formed by different predetermined exposure amounts.

DETAILED DESCRIPTION OF THE PREFERRED EMBODIMENTS

In this specification, "an embodiment" means serving as an example, instance, or illustration. Moreover, in this specification and the appended claims the article "a" may generally be construed to mean "one or more" unless specified otherwise or clear from the context to be guided towards the singular form.

Figure 1:
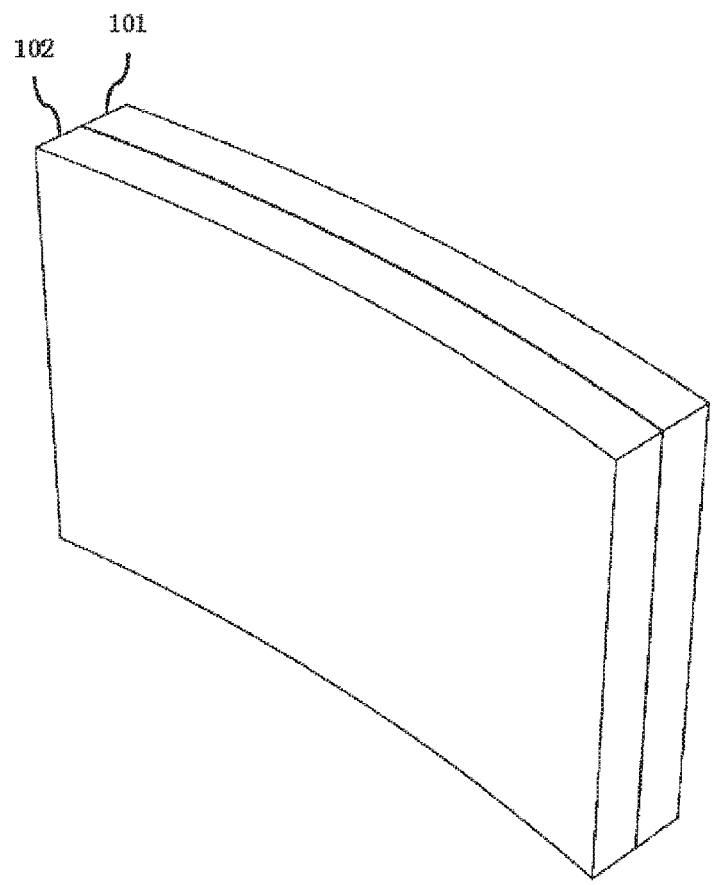
FIG. 1 is a schematic view of a curved display device of the present invention.
Figure 2:
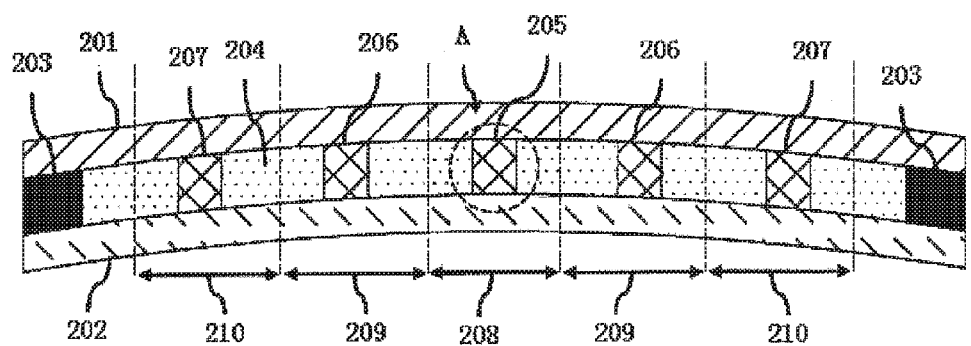
FIG. 2 is a cross-section view of the curved display panel of FIG. 1.

Refer now to FIG. 1 and FIG. 2, wherein FIG. 1 is a schematic view of a curved display device of the present invention; and FIG. 2 is a cross-section view of the curved display panel of FIG. 1.

A curved display device of this embodiment comprises a curved backlight module 101 and a curved display panel 102, wherein the curved display panel 102 and the curved backlight module 101 are assembled into one piece. The curved display panel 102 of the embodiment is, for example, a TFT-LCD (thin film transistor liquid crystal display).

The curved display panel 102 comprises a curved thin film transistor array substrate 201, a liquid crystal layer 204, a curved color filter substrate 202, and a spacer assembly. The curved color filter substrate 202 and the curved thin film transistor array substrate 201 are assembled into one piece. The liquid crystal layer 204 is disposed between the curved color filter substrate 202 and the curved thin film transistor array substrate 201. The curved display panel 102 is further provided with a sealant 203.

The curved display panel 102 comprises at least one first area 208 and at least two second areas 209. The first area 208 is positioned in the middle of the curved display panel 102. The at least two second areas 209 are positioned at the two sides of the first area 208 along a curved edge direction of the curved display panel 102. The curved display panel 102 can further comprise at least two third areas 210, and the third areas 210 are positioned at the two sides of the first area 208 and the second areas 209 along the curved edge direction of the curved display panel 102, wherein the curved edge direction is a direction of a curved line which is an arc corresponding to the curved edge of the curved display panel 102. That is, the first area 208, the second areas 209, and third areas 210 are arranged in order along the curved edge direction, wherein the second areas 209 are positioned on the outsides of the first area 208 far away from the center of the curved display panel 102, and the third areas 210 are positioned on the outsides of the second areas 209 far away from the center of the curved display panel 102.

The spacer assembly is disposed on the curved color filter substrate 202, and the spacer assembly is used to maintain a predetermined distance between the curved thin film transistor array substrate 201 and the curved color filter substrate 202.

In the first area 208, a first interval is formed between the curved color filter substrate 202 and the curved thin film transistor array substrate 201; and in the second area 209, a second interval is formed between the curved color filter substrate 202 and the curved thin film transistor array substrate 201. The first interval is equal to the second interval.

By above-mentioned technical solution, a cell thickness of a liquid crystal cell of the curved display panel 102 (the interval between the curved color filter substrate 202 and the curved thin film transistor array substrate 201) can be kept identical in each of the areas, which is advantageous in avoiding the appearance of a display defect (for example, a phenomenon of uneven brightness) which is caused by an uneven cell thickness of the curved display panel 102.

In the embodiment, the curved display panel 102 is formed by bending a flat display panel which is composed of a flat color filter substrate and a flat thin film transistor array substrate.

Figure 3:
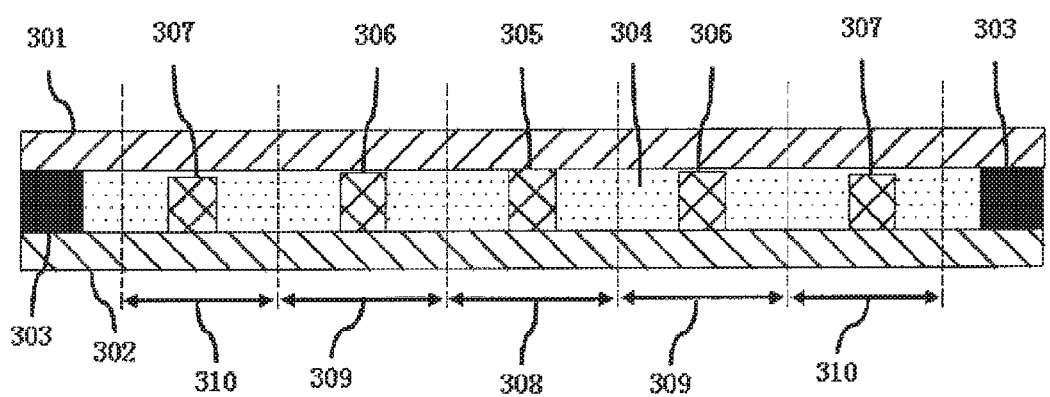
FIG. 3 is a schematic view showing the curved display of FIG. 2 in a position before being bent.

As shown in FIG. 3, the curved color filter substrate is a flat color filter substrate 302 when it is in a flat position, and the curved thin film transistor array substrate is a flat thin film transistor array substrate 301 when it is in a flat position.

A third interval is formed between the flat color filter substrate and the flat thin film transistor array substrate of the flat display panel. The third interval is greater than the first interval (or the second interval).

The spacer assembly is used to form the first interval in the first area 208 when the flat display panel has been bent, and is used to form the second interval in the second area 209 when the flat display panel has been bent. That is, the spacer assembly is used to compensate the cell thickness in a partial area of the liquid crystal cell of the curved display panel 102 (the interval between the curved color filter substrate and the curved thin film transistor array substrate) after the flat display panel has been bent into the curved display panel 102, so that the cell thickness of each area of the liquid crystal cell can be kept even.

In the embodiment, the spacer assembly comprises at least one first spacer 205 and at least two second spacers 206.

The first spacer 205 is disposed in the first area 208. Before the flat color filter substrate is bent into the curved color filter substrate 202, corresponding to the plane of the flat color filter substrate, the first spacer 205 has a first height in a first direction, wherein the first direction is a direction which is perpendicular to the flat color filter substrate.

The second spacer 206 is disposed in the second area 209. Before the flat color filter substrate is bent into the curved color filter substrate 202, corresponding to the plane of the flat color filter substrate, the second spacer 206 has a second height in the first direction.

The first height is greater than the second height.

Figure 4:
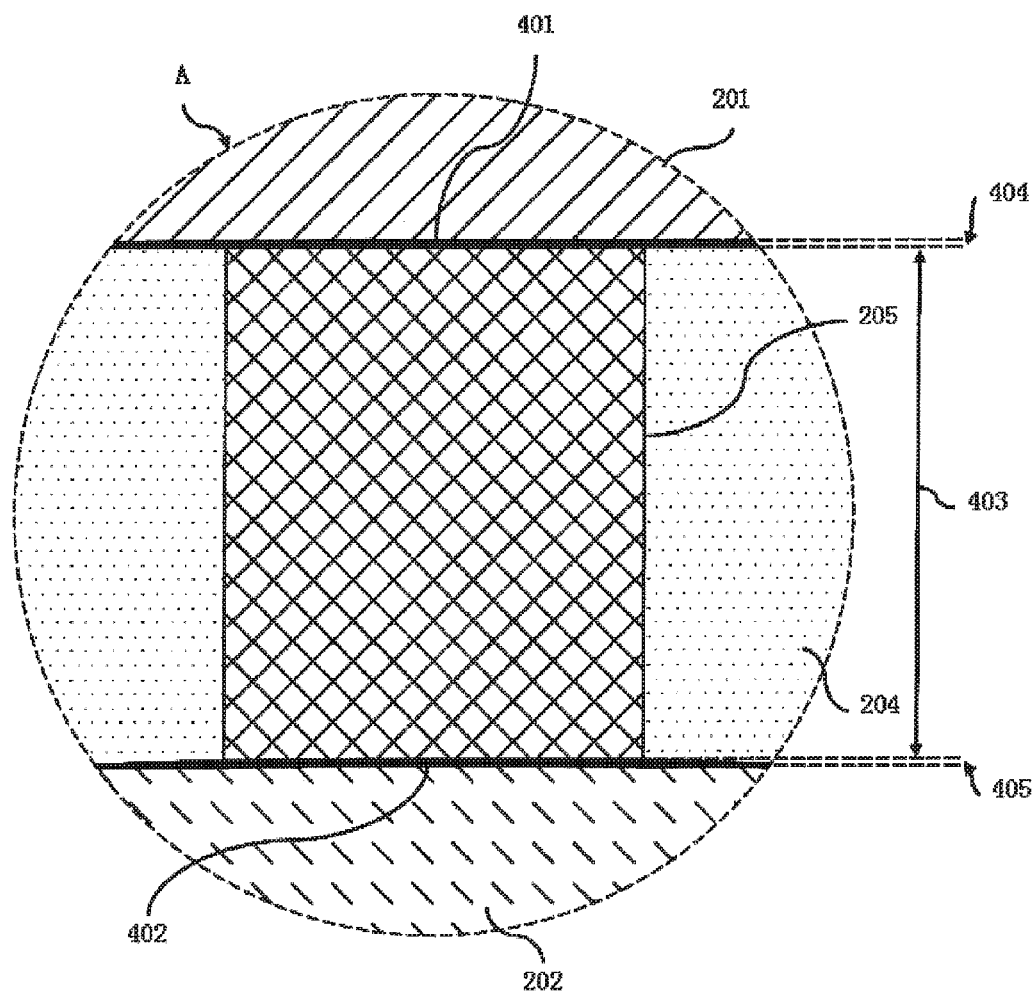
FIG. 4 is a schematic view of area A of FIG. 2.

After the flat color filter substrate has been bent into the curved color filter substrate 202, the first spacer 205 has a third height, as shown in FIG. 4, and the second spacer 206 has a fourth height. The first height is greater than the third height, and the second height is greater than the fourth height.

The third height is equal to the predetermined distance, and the fourth height is equal to the predetermined distance.

The first spacer 205 is used to be shrunken from the first height to the third height by a compression of the curved color filter substrate and the curved thin film transistor array substrate. The second spacer 206 is used to be shrunken from the second height to the fourth height by the compression of the curved color filter substrate and the curved thin film transistor array substrate.

The spacer assembly can further comprise at least two third spacers 207. The third spacers 207 are disposed in the third area 210. Before the flat color filter substrate is bent into the curved color filter substrate 202, corresponding to the plane of the flat color filter substrate, the third spacer 207 has a fifth height in the first direction. The second height is greater than the fifth height. After the flat color filter substrate has been bent into the curved color filter substrate 202, the third spacer 207 has a sixth height. The fifth height is greater than the sixth height.

The predetermined distance is equal to the sixth height.

The third spacer 207 is used to be shrunken from the fifth height to the sixth height by the compression of the curved color filter substrate and the curved thin film transistor array substrate.

Refer now to FIG. 4, which is a schematic view of area A of FIG. 2.

In the embodiment, in the first area 208, the sum of a first deformation amount of the curved color filter substrate 202 and a second deformation amount of the curved thin film transistor array substrate 201 is equal to or greater than a first compression amount of the first spacer 205, wherein the first compression amount is a deformation amount of the first spacer 205 which is compressed by the curved color filter substrate 202 and the curved thin film transistor array substrate 201. The first compression amount is the difference of the first height and the third height.

In the second area 209, the sum of a third deformation amount of the curved color filter substrate 202 and a fourth deformation amount of the curved thin film transistor array substrate 201 is equal to or greater than a second compression amount of the second spacer 206, wherein the second compression amount is a deformation amount of the second spacer 206 which is compressed by the curved color filter substrate 202 and the curved thin film transistor array substrate 201. The second compression amount is the difference of the second height and the fourth height.

In the third area 210, the sum of a fifth deformation amount of the curved color filter substrate 202 and a sixth deformation amount of the curved thin film transistor array substrate 201 is equal to or greater than a third compression amount of the third spacer 207, wherein the third compression amount is a deformation amount of the third spacer 207 which is compressed by the curved color filter substrate 202 and the curved thin film transistor array substrate 201. The third compression amount is the difference of the fifth height and the sixth height.

In the embodiment, a first projection 402 is formed on a first surface of the curved color filter substrate 202 in the first area 208 along a first curvature radius and toward the curved thin film transistor array substrate 201. The first deformation amount 405 (the height/thickness of the first projection 402) is an amount which projects on the first surface of the curved color filter substrate 202 in the first area 208 along the first curvature radius and toward the curved thin film transistor array substrate 201. The first curvature radius is a curvature radius in the first area 208 of the curved color filter substrate 202, and the first surface is a surface of the curved color filter substrate 202 which faces the liquid crystal layer 204.

A second projection or recession 401 is formed on a second surface of the curved thin film transistor array substrate 201 in the first area 208 along a first curvature radius and toward the curved color filter substrate 202. The second deformation amount 404 (the height/thickness of the second projection 401) is an amount which projects or recesses on the second surface of the curved thin film transistor array substrate 201 in the first area 208 along the first curvature radius and toward the curved color filter substrate 202. The second surface is a surface of the thin film transistor array substrate 201 which faces the liquid crystal layer 204.

A third deformation amount is an amount which projects on the first surface of the curved color filter substrate 202 in the second area 209 along a second curvature radius and toward the curved thin film transistor array substrate 201. The second curvature radius is a curvature radius in the second area 209 of the curved color filter substrate 202.

A fourth deformation amount is an amount which projects on the second surface of the curved thin film transistor array substrate 201 in the second area 209 along a second curvature radius and toward the curved color filter substrate 202.

A fifth deformation amount is an amount which projects on the first surface of the curved color filter substrate 202 in the third area 210 along a third curvature radius and toward the curved thin film transistor array substrate 201. The third curvature radius is a curvature radius in the third area 210 of the curved color filter substrate 202.

A sixth deformation amount is an amount which projects on the second surface of the curved thin film transistor array substrate 201, in the third area 210 along a third curvature radius and toward the curved color filter substrate 202.

The first spacer 205 with the first height, the second spacer 206 with the second height, and the third spacer 207 with the third height are formed by different predetermined exposure amounts. That is, in the forming processes of the first spacer 205, second spacer 206, and the third spacer 207, there are different predetermined exposure amounts to the first spacer 205, second spacer 206, and the third spacer 207 respectively.

a formula for calculating an m-th deformation amount $\Delta Hm$ of the curved color filter substrate 202 is:

$$\Delta Hm = \epsilon m * Dm, \text{ the unit of the } m\text{-th deformation amount is meters.}$$

The $\epsilon m$ is a strain in an m-th area of the first surface of the curved color filter substrate 202 (for example, the first area 208, the second area 209, and the third area 210). The Dm is a thickness in the m-th area of the first surface of the curved color filter substrate 202. The unit of the Dm is meters. a formula for calculating the $\epsilon m$ is:

$$\epsilon m = ln\{[(\eta m + ym)*am]/(\eta m*am)\} = ln[1+(ym/\eta m)] \approx ym/\eta m;$$

The $\eta m$ is a curvature radius in the m-th area of a middle layer of the curved color filter substrate 202. The ym is a distance from a deforming point to the middle layer of the curved color filter substrate 202. The am is a corresponding angle in the m-th area of the middle layer of the first surface of the curved color filter substrate 202. m is a positive integer, and the unit of the $\eta m$, ym, and am is meters, and the unit of am is degree.

Figure 5:
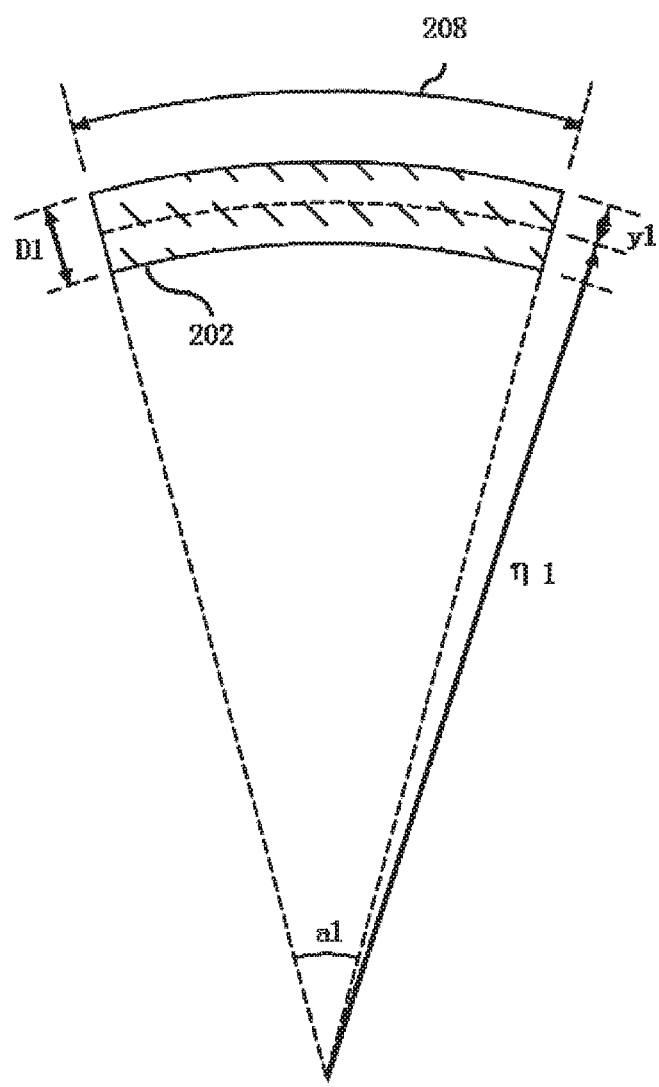
FIG. 5 is a schematic view which is a reference to calculate a strain of a first area of a color filter substrate.

As shown in FIG. 5, the $\eta 1$ is the curvature radius in the first area of the middle layer of the curved color filter substrate. The y1 is a distance from a deforming point to the middle layer of the curved color filter substrate 202. The a1 is a corresponding angle in the first area of the middle layer of the first surface of the curved color filter substrate.

Likewise, a formula for calculating an n-th deformation amount $\Delta Hn$ of the the curved thin film transistor array substrate 201 is:

$$\Delta Hn = \epsilon n * Dn, \text{ the unit of the } n\text{-th deformation amount is meters.}$$

The $\epsilon n$ is a strain in an n-th area of the second surface of the curved thin film transistor array substrate 201 (for example, the first area 208, the second area 209, and the third area 210). The Dn is a thickness in the n-th area of the first surface of the curved thin film transistor array substrate 201. The unit of the Dn is meters. A formula for calculating the $\epsilon n$ is:

$$\epsilon n = ln\{[(\eta n + yn)*an]/(\eta n*an)\} = ln[1+(yn/\eta n)] \approx yn/\eta n;$$

The $\eta n$ is a curvature radius in the n-th area of a middle layer of the curved thin film transistor array substrate 201. The yn is a distance from a deforming point to the middle layer of the curved thin film transistor array substrate 201. The an is a corresponding angle in the n-th area of the middle layer of the first surface of the curved thin film transistor array substrate 201. n is a positive integer, and the unit of the $\eta n$, yn, and an is meters, and the unit of an is degrees.

The m-th deformation amount $\Delta Hm$ comprises: a first deformation amount $\Delta H1$, a third deformation amount $\Delta H3$, a fifth deformation amount $\Delta H5$, etc.

The n-th deformation amount $\Delta Hn$ comprises: a second deformation amount $\Delta H2$, a fourth deformation amount $\Delta H4$, a sixth deformation amount $\Delta H6$, etc.

Therefore, the first deformation amount $\Delta H1$, the second deformation amount $\Delta H2$, the third deformation amount $\Delta H3$, the fourth deformation amount $\Delta H4$, the fifth deformation amount $\Delta H5$, and the sixth deformation amount $\Delta H6$ can be obtained.

The first height is obtained according to the first deformation amount $\Delta H1$, the second deformation amount $\Delta H2$, and the first interval; in the same way, the second height and the fifth height can be obtained.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such features may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

The present invention has been described with preferred embodiments thereof and it is understood that many changes and modifications to the described embodiments can be carried out without departing from the scope and the spirit of the invention that is intended to be limited only by the appended claims.

What is claimed is:

1. A design method for a curved display panel, comprising:
   providing a curved display panel, which comprises:
      a curved thin film transistor array substrate;
      a liquid crystal layer;
      a curved color filter substrate; and
      a spacer assembly disposed on the curved color filter substrate, wherein the spacer assembly is configured to maintain a predetermined distance between the curved thin film transistor array substrate and the curved color filter substrate;
   wherein the curved display panel comprises:
      at least one first area positioned in the middle of the curved display panel; and
      at least two second areas positioned at two sides of the first area along a curve of the curved display panel;
   wherein the curved color filter substrate and the curved thin film transistor array substrate are assembled into one piece; and the liquid crystal layer is disposed between the curved color filter substrate and the curved thin film transistor array substrate;
   wherein, in the first area, a first interval is formed between the curved color filter substrate and the curved thin film transistor array substrate; and
   in the second areas, a second interval is formed between the curved color filter substrate and the curved thin film transistor array substrate; and the first interval is equal to the second interval;
   wherein the curved display panel is formed by bending a flat display panel which is composed of a flat color filter substrate and a flat thin film transistor array substrate;
   wherein the curved color filter substrate is a flat color filter substrate when it is in a flat position, and the curved thin film transistor array substrate is a flat thin film transistor array substrate when it is in a flat position;
   wherein a third interval is formed between the flat color filter substrate and the flat thin film transistor array substrate of the flat display panel; and
   wherein the spacer assembly is configured to form the first interval in the first area when the flat display panel has been bent, and is configured to form the second interval in the second areas when the flat display panel has been bent;
   wherein the spacer assembly comprises:
      at least one first spacer, wherein the first spacer is disposed in the first area; and before the flat color filter substrate is bent into the curved color filter substrate, corresponding to the plane of the flat color filter substrate, the first spacer has a first height in a first direction; wherein the first direction is a direction which is perpendicular to the flat color filter substrate; and
      at least two second spacers, wherein the second spacers are disposed in the second areas; and before the flat color filter substrate is bent into the curved color filter substrate, corresponding to the plane of the flat color filter substrate, the second spacers have a second height in the first direction;
   wherein the first height is greater than the second height;
   wherein after the flat color filter substrate has been bent into the curved color filter substrate, the first spacer has a third height, and the second spacers have a fourth height;
   wherein the third height is equal to the predetermined distance, and the fourth height is equal to the predetermined distance;
   wherein the first spacer is configured to be shrunken from the first height to the third height by a compression of the curved color filter substrate and the curved thin film transistor array substrate;
   wherein the second spacers are configured to be shrunken from the second height to the fourth height by the compression of the curved color filter substrate and the curved thin film transistor array substrate;
   wherein in the first area, the sum of a first deformation amount of the curved color filter substrate and a second deformation amount of the curved thin film transistor array substrate is equal to or greater than a first compression amount of the first spacer, wherein the first compression amount is a deformation amount of the first spacer which is compressed by the curved color filter substrate and the curved thin film transistor array substrate;
   wherein in the second areas, the sum of a third deformation amount of the curved color filter substrate and a fourth deformation amount of the curved thin film transistor array substrate is equal to or greater than a second compression amount of the second spacers, wherein the second compression amount is a deformation amount of the second spacers which are compressed by the curved color filter substrate and the curved thin film transistor array substrate; the second compression amount is the difference of the second height and the fourth height;
   wherein the first deformation amount is an amount which projects on a first surface of the curved color filter substrate, in the first area along the first curvature radius and toward the curved thin film transistor array substrate;
   and the first curvature radius is a curvature radius in the first area of the curved color filter substrate, and the first surface is a surface of the curved color filter substrate which faces the liquid crystal layer;
   wherein the second deformation amount is an amount which projects or recesses on a second surface of the curved thin film transistor array substrate in the first area along the first curvature radius and toward the curved color filter substrate; and the second surface is a surface of the thin film transistor array substrate which faces the liquid crystal layer;
   wherein the third deformation amount is an amount which projects on the first surface of the curved color filter substrate, in the second areas along a second curvature radius and toward the curved thin film transistor array substrate; the second curvature radius is a curvature radius in the second areas of the curved color filter substrate;
   wherein the fourth deformation amount is an amount which projects on the second surface of the curved thin film transistor array substrate, in the second areas along a second curvature radius and toward the curved color filter substrate;
   wherein a formula for calculating an m-th deformation amount $\Delta Hm$ of the curved color filter substrate is:

$$\Delta Hm = \epsilon m * Dm;$$

wherein the $\epsilon_m$ is a strain in an m-th area of the first surface of the curved color filter substrate; the $D_m$ is a thickness in the m-th area of the first surface of the curved color filter substrate; a formula for calculating the $\epsilon_m$ is:

$$\epsilon_m = \ln\{[(\eta_m + y_m)^* a_m]/(\eta_m {}^* a_m)\} = \ln[1 + (y_m/\eta_m)] \approx y_m/\eta_m;$$

wherein the $\eta_m$ is a curvature radius in the m-th area of a middle layer of the curved color filter substrate; the $y_m$ is a distance from a deforming point to the middle layer of the curved color filter substrate; the $a_m$ is a corresponding angle in the m-th area of the middle layer of the first surface of the curved color filter substrate; m is a positive integer;

wherein a formula for calculating an n-th deformation amount $\Delta H_n$ of the curved thin film transistor array substrate is:

$$\Delta H_n = \epsilon_n {}^* D_n;$$

wherein the $\epsilon_n$ is a strain in an n-th area of the second surface of the curved thin film transistor array substrate; the $D_n$ is a thickness in the n-th area of the first surface of the curved thin film transistor array substrate; a formula for calculating the $\epsilon_n$ is:

$$\epsilon_n = \ln\{[(\eta_n + y_n)^* a_n]/(\eta_n {}^* a_n)\} = \ln[1 + (y_n/\eta_n)] \approx y_n/\eta_n;$$

wherein the $\eta_n$ is a curvature radius in the n-th area of a middle layer of the curved thin film transistor array substrate; the $y_n$ is a distance from a deforming point to the middle layer of the curved thin film transistor array substrate; the $a_n$ is a corresponding angle in the n-th area of the middle layer of the first surface of the curved thin film transistor array substrate; n is a positive integer.

2. The design method for the curved display panel according to claim 1, wherein the m-th deformation amount $\Delta H_m$ comprises: a first deformation amount and a third deformation amount; and the n-th deformation amount $\Delta H_n$ comprises: a second deformation amount and a fourth deformation amount.

3. The design method for the curved display panel according to claim 1, wherein the first spacer with the first height and the second spacers with the second height are formed by different predetermined exposure amounts.

* * * * *